Patented Sept. 29, 1942

2,297,108

UNITED STATES PATENT OFFICE 2,297,108

FLUORESCENT MATERIAL

Alfred H. McKeag, North Wembley, and Peter Whitten Ranby, Wembley, England, assignors to General Electric Company, a corporation of New York No Drawing. Application January 30, 1942, Serial No. 428,908. In Great Britain August 27, 1940

6 Claims. (Cl. 250—81)

Our invention relates to luminescent (fluorescent or phosphorescent) materials. An object of our invention is to provide luminescent materials which, like the well-known sulphides, are excitable by the mercury line at 3650 A. U. (that is to say, by radiation to which ordinary glass is transparent) and give luminescent light of a wide variety of colors and yet are superior to the sulphides in some important respects. Of course, the materials may be excitable by radiation of other, and especially of neighboring, wavelengths, and may be excited by other agencies, such as cathode rays. Here and hereinafter the statement that a material is excitable by a given agency means that it can be excited to luminescence by that agency to a degree that renders it a "luminescent material" in the sense in which that term is used in the art of manufacturing electric discharge lamps.

According to the invention this object is achieved by activating a matrix of an alkaline earth silicate by europium. (The term alkaline earth silicate implies that the greater part of the base combined with the silica is an alkaline earth, but it does not exclude the presence in the material of metals other than the alkaline earth metals).

Luminescent materials according to the invention may be prepared by well-known methods. That which has proved most successful is to heat to a temperature of 800°–1150° C. a mixture of $n$ molecules MO or MCO$_3$ (where M is an alkaline earth metal), and $m$ molecules SiO$_2$, and a small proportion of an europium compound. The main constituents should be of that degree of purity now recognized as desirable in the manufacture of luminescent silicates. The europium should constitute about 0.1% of the mixture by weight. The luminescent properties of the resulting material vary with the ratio $n/m$ and also with the temperature (and possibly also with the time) of the heating.

The following table indicates the nature of the results obtained; the heating, except for the variation in temperature, was conducted in all cases as described below with reference to the particular example. Y represents yellow; G green; B blue; V violet. The hue represented by one of these symbols varies considerably, but in the absence of full colorimetry, any attempt to represent the colors more precisely might be misleading. The colors are in general far from saturated. The symbols ++, +, — represent relatively strong, moderate, and weak luminescence, when excited by 3650 A. U.

Table I

| M. n/m. | | Temperature of heating | | |
|---|---|---|---|---|
| | | 800° C. | 1,000° C. | 1,150° C. |
| Ca | 3 | G++ | YG+ | G+ |
| Ca | 2 | G++ | YG+ | B+ |
| Ca | 1½ | G+ | G— | B+ |
| Ca | 1 | B— | B— | B++ |
| Ca | ⅔ | VB++ | VB+ | B+ |
| Ca | ½ | VB+ | B+ | B+ |
| Sr | 3 | Y++ | Y+ | Y+ |
| Sr | 2 | Y++ | Y— | Y— |
| Sr | 1½ | Y— | V+ | V— |
| Sr | 1 | YG+ | B+ | V+ |
| Sr | ⅔ | GB++ | V+ | V— |
| Sr | ½ | G+ | G— | G— |
| Ba | 3 | G— | G+ | G+ |
| Ba | 2 | G++ | G++ | G++ |
| Ba | 1½ | G++ | Y— | Y— |
| Ba | 1 | G— | B+ | G— |
| Ba | ⅔ | G— | B++ | B+ |
| Ba | ½ | B— | B— | B— |

Mixtures of two or more alkaline earth metals in the same silicate can be used. The following table shows some results obtained with such double silicates, the temperature of heating being always 900° C.

Table II

1CaO.1SrO.3SiO$_2$ Y+
1CaO.1SrO.2SiO$_2$ Y+
1CaO.1SrO.1SiO$_2$ G+

1CaO.1BaO.3SiO$_2$ B—
1CaO.1BaO.2SiO$_2$ B—
1CaO.1BaO.1SiO$_2$ B—

1SrO.1BaO.3SiO$_2$ B+
1SrO.1BaO.2SiO$_2$ Y+
1SrO.1BaO.1SiO$_2$ YG++

X-ray evidence indicates that in some of the compounds more than one lattice structure is involved.

Perhaps the most remarkable feature of some of these materials is their comparative indifference to temperature. It is known that the luminescent efficiency of the sulphides decreases very rapidly as the temperature increases from room temperature and is almost zero at 200° C. Some of the europium-activated silicates still have a strong luminescence at 300° C. or even 400° C.; the material 2SrO.3SiO$_2$ heated during manufacture to 800° C. is outstanding in this respect. This property makes the materials very valuable when used in the well-known manner in combination with high pressure metal (mercury)

vapor electric discharge lamps; thus one of the materials giving blue or greenish blue light may appropriately replace the zinc sulphide usually employed to add blue light to the light from the discharge and the red light from other luminescent materials excited by it. The material may be coated on the inner surface of an outer envelope or jacket surrounding a high pressure mercury lamp having a quartz bulb.

The chemical stability of many materials according to the invention is also greater than that of the sulphides; such materials are therefore well adapted to be used on surfaces exposed to the atmosphere and intended to be excited by radiation from "black lamps." But some of the materials are unstable in the presence of moisture; for example those having the compositions $1CaO:1SiO_2$, $2CaO3SiO_2$, $1CaO.2SiO_2$ and prepared by heating to a temperature above 1000° C.

Further details will now be given, by way of example, of two methods of preparing a material according to the invention. The reagents mentioned are of AnalaR grade (AnalaR is a registered trade-mark) when they are available in that grade.

In the first method 250 gms. of $CaCl_2$ are dissolved in 500 ml. of distilled water and 15 ml. of ammonium sulphide solution added. The liquid is filtered clear. The equivalent amount of $(NH_4)HCO_3$ is similarly dissolved and purified. The solutions are mixed; the precipitated calcium carbonate is filtered off, washed six times with distilled water, dried at 160° C., and heated to about 1000° C. till converted to oxide.

Silica is prepared by allowing $SiCl_4$ to drip slowly into distilled water. The gel is washed six times with distilled water. It is used in the form of gel; but a sample is ignited to determine the $SiO_2$ content.

Among europium compounds the chloride is to be preferred. The rarity of europium compounds is due to the low concentration of the element in nature rather than to the difficulty of separating it from the other rare earths; for it can be strongly divalent; any reasonably pure sample of the chloride is likely to suffice. We have used a solution containing 0.1 gm. of the chloride per 100 ml. of distilled water.

The ignited calcium oxide, the silica gel, and the europium solution are intimately mixed, so as to give the desired ratio $n/m$ with 0.1% by weight of europium element. The mixture is dried at 160° C., ground to powder, and heated in air at 800° C. for 15 minutes. The product is reground and heated in hydrogen at 800° C. for another 15 minutes. It is allowed to cool in the hydrogen atmosphere.

The second and preferred method differs from the first in that the calcium carbonate is mixed as such with the silica gel and europium solution; it is not first converted into oxide.

Our experiments indicate that, at least in the final stage of heating, the materials must be surrounded by a reducing atmosphere; apparently, if it is to be effective in activating the silicate, the europium must be in the $Eu^{++}$ state.

What we claim as new and desire to secure by Letters Patent of the United States is:

1. A phosphor comprising a matrix of alkaline earth metal silicate activated with europium, and fluorescing in the color range of yellow, green, blue, violet when excited by 3650 Å. radiation.

2. A phosphor comprising a matrix of alkaline earth metal silicate activated with about 0.1 per cent of europium, and fluorescing in the color range of yellow, green, blue, violet when excited by 3650 Å. radiation.

3. A phosphor comprising a matrix of calcium silicate activated with europium, and fluorescing in the color range of yellow, green, blue, violet when excited by 3650 Å. radiation.

4. A phosphor comprising a matrix of strontium silicate activated with europium, and fluorescing in the color range of yellow, green, blue, violet when excited by 3650 Å. radiation.

5. A phosphor comprising a matrix of barium silicate activated with europium, and fluorescing in the color range of yellow, green, blue, violet when excited by 3650 Å. radiation.

6. A high pressure mercury vapor lamp having associated therewith a coating of fluorescent material comprising a matrix of an alkaline earth silicate activated by europium, said fluorescent material being exposed to the radiation of 3650 Å. emitted by the lamp.

ALFRED H. McKEAG.
PETER WHITTEN RANBY.